United States Patent [19]
Adams et al.

[11] Patent Number: 5,906,236
[45] Date of Patent: May 25, 1999

[54] HEAT EXCHANGE JACKET FOR ATTACHMENT TO AN EXTERNAL SURFACE OF A PUMP MOTOR

[75] Inventors: James M. Adams; Jossef Feher, both of Houston, Tex.

[73] Assignee: Heatflo Systems, Inc., Houston, Tex.

[21] Appl. No.: 09/095,355

[22] Filed: Jun. 10, 1998

Related U.S. Application Data

[60] Provisional application No. 60/054,029, Jul. 28, 1997.

[51] Int. Cl.$^6$ .................................................. F28F 7/00
[52] U.S. Cl. ........................... 165/46; 165/47; 165/147; 165/169; 165/905; 310/54; 310/64; 417/372; 417/366
[58] Field of Search .................................... 165/906, 905, 165/47, 46, 169, 146, 147; 417/372, 371, 370, 369, 368, 367, 366; 310/53, 54, 64; 4/545

[56] References Cited

U.S. PATENT DOCUMENTS

| | | | |
|---|---|---|---|
| 310,185 | 1/1885 | Deane | 165/169 |
| 2,011,854 | 8/1935 | Emmons et al. | 165/906 |
| 2,862,120 | 11/1958 | Onsrud | 165/169 |
| 3,127,530 | 3/1964 | White | 310/54 |
| 3,498,371 | 3/1970 | Zygiel | 165/168 |
| 4,213,498 | 7/1980 | Vandenbossche | 165/169 X |
| 4,331,201 | 5/1982 | Hesse | 165/906 X |
| 4,497,365 | 2/1985 | Boyer | 165/169 X |
| 4,516,044 | 5/1985 | Bone | 165/169 X |
| 4,854,373 | 8/1989 | Williams | 165/169 X |
| 5,038,853 | 8/1991 | Callaway, Sr. et al. | 165/905 X |
| 5,509,463 | 4/1996 | Callaway, Sr. et al. | 165/905 X |

FOREIGN PATENT DOCUMENTS 0194283  10/1985  Japan ..................................... 165/906

*Primary Examiner*—Ira S. Lazarus
*Assistant Examiner*—Christopher Atkinson
*Attorney, Agent, or Firm*—Harrison & Egbert

[57] ABSTRACT

A heat exchange jacket for attachment to an external surface of a pump motor having a bottom surface with a shape conforming to a curvature of the housing of the pump motor, a top surface joined to the bottom surface so as to define a heat exchange chamber therebetween, a fluid inlet connected to the top surface and communicating with the chamber, and a fluid outlet communicating with the chamber. The surface of the heat exchange jacket are formed of a polymeric material. The fluid outlet is positioned below the fluid inlet. The bottom surface has a curved shape with the top surface extending in concentric relationship therewith. The fluid inlet is positioned above the top surface and is located between a forward end and a rearward end of the top surface. The fluid outlet includes a first fluid outlet located on one side adjacent to the bottom of the heat exchange jacket and a second fluid outlet positioned on an opposite side of the heat exchange jacket adjacent to a bottom of the jacket.

17 Claims, 2 Drawing Sheets

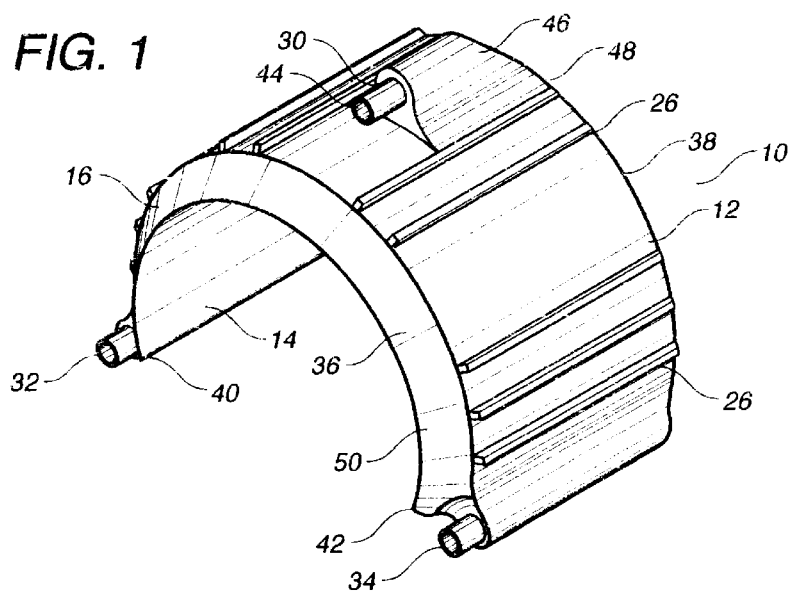
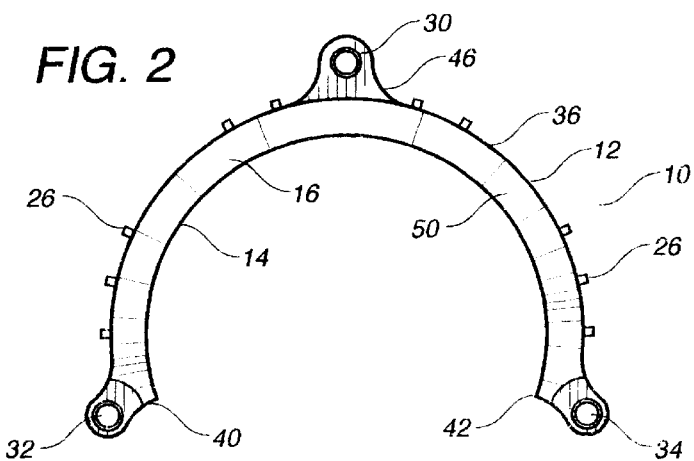
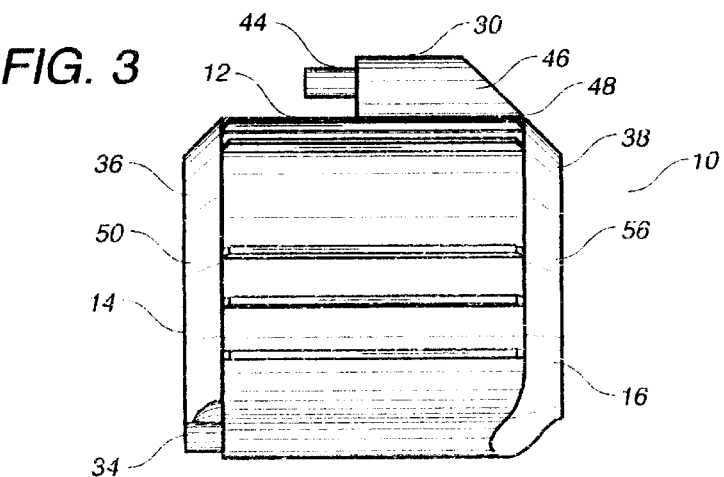

HEAT EXCHANGE JACKET FOR ATTACHMENT TO AN EXTERNAL SURFACE OF A PUMP MOTOR

RELATED APPLICATIONS

The present application is a utility patent application which is based upon earlier filed provisional patent application Ser. No. 60/054,029, filed on Jul. 28, 1997, and entitled "Heat Transfer System", presently pending.

TECHNICAL FIELD

The present invention relates generally to heat exchangers, and more particularly to an arcuate heat exchanger which engages the exterior of a fluid pump motor and utilizes the heat produced by the motor to heat fluid circulated through the heat exchangers.

BACKGROUND ART

Most spas, hot tubs, and therapy tubs which utilize jet nozzles to circulate water to the tub have a circulating system utilizing a motor with a centrifugal pump which takes a suction from the bottom of the tub and delivers the water through an electrical heat exchanger, or heater, to the discharge nozzles in the tub. The electrical heaters have heating elements which wear out and have electrical wires which may become grounded. The heater is controlled by a thermostat which regulates the tub water temperature. The Consumer Products Safety Commission states that the maximum temperature for a hot tub should not exceed 104° F.

The commonly used thermostat is only accurate to within 3° F. A person in the tub will usually experience an uncomfortable cooling effect as the water reaches the lower limit (less than about 100° F.) to activate the heater, and then an uncomfortable rise in the water temperature as the heated water is discharged through the nozzles. Thus, the occupant is subjected to an endless cycle of cooling and heating as the heater cycles on and off. The constant cycling of the heater consumes significant energy and is expensive to operate.

The electric motor which powers the pump circulating the water produces heat during its operation which is roughly proportional to its horsepower rating. Typically, the coil of the motor will reach a temperature of about 196° F. and the motor housing or casing will reach a temperature of about 155° F. However, this energy is dissipated into the atmosphere by the motor casing and is wasted.

The present invention provides a means of recovering the wasted heat energy of the motor and utilizes it to heat the water being pumped and circulated to the tub. Thus, it eliminates the need for an electric heater which results in conservation of energy, reduction in the cost of operation of the heated tub, and maintains the tub water at a substantially constant and comfortable temperature.

The pumps used in water circulation systems in the pool and spa industry are required to be of the "100% drain" type. In other words, the system including the pump must completely drain all water out of the system to prevent growth of bacteria. The high pressure side of the pump is referred to as the discharge end and the low pressure side is referred to as the intake, or suction end of the pump. The standard combination pump/motor has the high pressure (discharge) connection above the mid-point (usually at the top) and above the low pressure (intake) pump connection.

The present invention utilizes the suction end of the pump to completely drain the water from the heat exchanger, thus the heat exchanger in accordance with the present invention meets the "100% drain" requirements of industry regulations.

There are several patents which disclose various heat exchange apparatus for motors, most of which are directed toward devices which merely cool an electric motor.

U.S. Pat. No. 3,127,530 discloses a cooling apparatus for motor driven pumps wherein the motor is of the type having a cooling fluid internally circulated within the rotor chamber of the motor. A sheet metal casing is installed around the motor housing and cooling fluid is pumped through through the casing to cool the motor. Alternatively, if additional cooling is required, a length of tubing bent in a serpentine coil with fittings at each end is placed between the motor housing and the sheet metal casing and the hot fluid from the internal cooling circuit of the motor is recirculated through the coiled tubing and exposed to the cooling fluid in the casing and back to the rotor chamber.

U.S. Pat. No. 2,862,120 discloses a fluid cooled electric motor housing. The housing or casing of the motor is a pair of concentric annular steel shells supported in spaced relation by a plurality of longitudinal, circumferentially spaced baffle ribs welded therebetween.

U.S. Pat. No. 4,516,044 discloses a motor cooling apparatus comprising a single piece or two-piece metal housing having a cylindrical cavity which surrounds the exterior of the motor. The side wall of the cylindrical cavity is provided with a series of pairs of parallel circumferentially incomplete grooves joined together at one end and enclosed by the exterior of the motor casing to form a water channel for cooling the motor.

U.S. Pat. No. 4,213,498 discloses a plastic heat exchanger which can be tightly faced on a cylindrical member to control the temperature of the member which comprises two plastic sheets separated by a plurality of parallel ribs fused thereto to form a plurality of channels, rectangular in cross-section and a pair of cylindrical channels connected at each end of the channels normal to the axis of the channels. The outer plastic sheet is provided with a layer of insulating foam.

U.S. Pat. No. 4,854,373, discloses a crescent shaped heat exchanger made of welded sheet metal plates conforming to the shape of the motor. The longitudinal (bottom) edges of the heat exchanger are inclined in opposite directions relative to a horizontal plane passing through the longitudinal axis. In other words, one side slides downwardly from front to back and the other side slopes downwardly from back to front. The lower end of each longitudinal end plate has a port so that water will drain toward both ports and water can be introduced through one port and discharged through the other. Since one pair of diagonally opposed corners of the heat exchanger are lower than the other diagonally opposed corners, the arc subtended by the inner curved plate is slightly greater than 180° F. when viewed transversely. This configuration is suggested to allow the device to snap fit onto the upper surface of the motor. However, the welded sheet metal construction would make this extremely difficult or impossible.

U.S. Pat. No. 5,509,463, issued on Apr. 23, 1996 to Calaway et al., teaches a saddle-type heat exchanger for use in combination with motor driven fluid pumps of the type having a motor with an outwardly curved upper surface. The heat exchanger has an arcuate heat exchange jacket formed of an inner wall, an outer wall, and a spacer frame sealed therebetween which has an open center section defining a hollow enclosed cavity. The jacket is configured to engage the exterior surface of the pump motor for maintaining heat exchange contact between the pump motor and the cavity. The jacket has a fluid inlet and one or more outlets. A venturi cross having a pair of tubular extensions may be connected to the intake port of the pump with one extension connected to the jacket inlet and the other extension the jacket outlet to subject the jacket to negative pressure by the venturi cross to draw a portion of the fluid through the jacket cavity and recirculate it through the pump. Alternatively, a cross having a pair of tubular extensions may be connected to the intake port of the pump and both extensions connected to a pair of jacket outlets in combination with a supply tee connected to the high pressure discharge conduit and to the jacket inlet to subject the jacket to the pressure differential between the pump intake port and the pump discharge port to pass a portion of the pressurized fluid through the jacket cavity and recirculate it through the pump. The supply tee may contain a thermostat to open and close fluid flow through the jacket.

It is an object of the present invention to provide a heat exchange jacket for a fluid pump which has enhanced strength.

It is another object of the present invention to provide a heat exchange jacket that increases water turbulence on the interior of the jacket.

It is another object of the present invention to provide a heat exchange jacket that has a top port for delivering water through the entirety of the jacket.

It is a further object of the present invention to provide a heat exchange jacket that more effectively distributes water flow throughout the interior of the jacket.

It is a further object of the present invention to provide a heat exchange jacket that has improved thermal conductivity.

It is a further object of the present invention to provide a heat exchange jacket which is easy to manufacture, easy to use, and relatively inexpensive.

These and other objects and advantages of the present invention will become apparent from a reading of the attached specification.

SUMMARY OF THE INVENTION

The present invention is an improvement on the teachings of U.S. Pat. No. 5,509,463 regarding the saddle-type heat exchanger for use in combination with a motor-driven fluid pump. In the present invention, the heat exchange jacket has a generally arcuate configuration suitable for being affixed to an exterior surface of the motor-driven fluid pump. The heat exchange jacket of the present invention is formed of a thermally conductive ABS material loaded with aluminum.

In particular, in the present invention, the jacket of the present invention has a bottom surface having a shape conforming to a curvature of the pump motor, a top surface joined to the bottom surface so as to define a heat exchange chamber therebetween, a fluid inlet connected to the top surface and communicating with the chamber, and a fluid outlet communicating with the chamber. The fluid outlet is positioned below the fluid inlet. The bottom surface has an arcuate shape. The top surface is in concentric relationship to the bottom surface and has a greater diameter than the bottom surface. The bottom surface has an arcuate configuration extending for greater than 180 degrees.

In the present invention, a forward end extends between the top surface and the bottom surface. A rearward end also extends between the top surface and the bottom surface. The forward end and the rearward end taper outwardly from the top surface to the bottom surface. The fluid inlet is positioned above the top surface and faces the forward end. The fluid inlet is located between the forward end and the rearward end. The fluid inlet has a back surface tapering downwardly toward the top surface and into the chamber. The back surface extends toward the rearward end. A plurality of ribs extend between the forward end and the rearward end. Each of the plurality of ribs is in parallel relationship to an adjacent rib.

In the present invention, a first bottom edge extends between the bottom surface and the top surface on one side of the jacket. A second bottom edge extends between the bottom surface and the top surface at an opposite side of the jacket. A first fluid outlet extends outwardly from one side of the jacket adjacent to the first bottom edge. A second fluid outlet extends outwardly from an opposite side of the jacket adjacent to the second bottom edge. The first and second fluid outlets have a longitudinal axis in parallel relationship to the longitudinal axis of the fluid inlet. The first and second fluid outlets face in a same direction as the fluid inlet.

BRIEF DESCRIPTION OF THE DRAWINGS

FIG. 1 is a perspective view of the heat exchange jacket in accordance with the preferred embodiment of the present invention.

FIG. 2 is an end view of the heat exchange jacket of the present invention.

FIG. 3 is a side elevational view of the heat exchange jacket of the present invention.

DETAILED DESCRIPTION OF THE INVENTION

Figure 4:
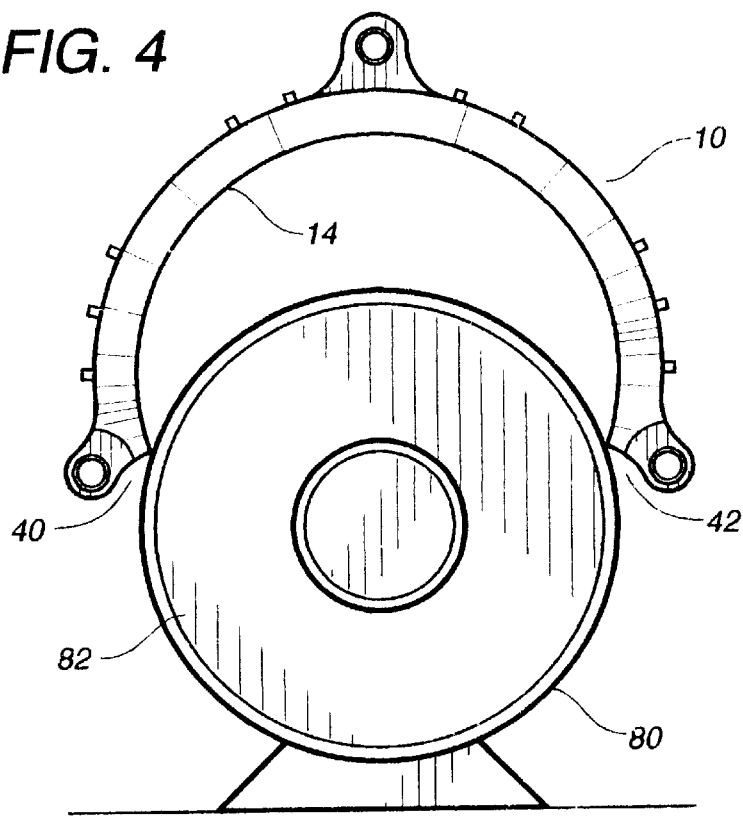
FIG. 4 is an end view showing the application of the heat exchange jacket of the present invention onto the housing of a pump motor.

Referring to FIG. 1, there is shown at 10 the heat exchange jacket in accordance with the preferred embodiment of the present invention. The heat exchange jacket 10 includes a top surface 12, a bottom surface 14 and a heat exchange chamber 16 formed between the top surface 12 and the bottom surface 14. A fluid inlet 30 is connected to the top surface 12 and communicates with the heat exchange chamber 16. A first fluid outlet 32 and a second fluid outlet 34 are located at the bottom of the heat exchange jacket 10 and communicate with the chamber 16. Each of the surfaces, the inlet 30 and the outlets 32 and 34 are formed of a polymeric material.

As can be seen, the top surface 12 has a plurality of ribs 26 extending longitudinally thereacross. Each of the ribs 26 extends between a forward end 36 and a rearward end 38 of the top surface 12. The ribs 26 are integrally formed with the top surface 12 so as to impart structural integrity to the top surface 12. It has been found that the inclusion of the ribs 26 greatly improves the structural integrity of the heat exchange jacket 10 of the present invention.

The bottom surface 14 is of an arcuate configuration which can conform to the curvature of a pump motor. Bottom surface 14 extends in generally concentric relationship with the top surface 12. The bottom surface 14 has a partially circular configuration extending for greater than 180 degrees. In the preferred embodiment of the present invention, the bottom surface 14 will extend for approximately 250 degrees so as to establish an ability to "snap fit" onto the housing of a pump motor. The bottom surface 14 terminates, on one side, on a first bottom edge 40 and, on the opposite side, on a second bottom edge 42.

The fluid inlet 30 has a connector 44 which communicates with a manifold area 46. Manifold area 46 allows for any fluids passed through the connector 44 and into the fluid inlet to be delivered, in a turbulent fashion, into the heat exchange chamber 16. The fluid inlet 30 is located on the top of the top surface 12 generally between the forward end 36 and the rearward end 38. The fluid inlet 30 has a back surface 48 which tapers downwardly to the rearward end 38 of the jacket 10.

In the present invention, the forward end 36 has a surface 50 which tapers from the top surface 12 to the bottom surface 14 at an approximately 45 degree angle. Similarly, there is a surface at the rearward end 38 which tapers from the top surface 12 to the bottom surface 14 at an approximately 45 degree angle. It has been found, with experimentation, that this taper facilitates the turbulent mixing of the fluid in the heat exchange chamber 16 of the heat exchange jacket 10. The fluid will pass into the fluid inlet 30 through the manifold 46 and into the heat exchange chamber 16. The fluid will pass along the interior surfaces of the bottom surface 14 in close proximity to the housing of the pump motor. As such, heat from the housing of the pump motor is passed to the fluid in the heat exchange chamber 16 of the heat exchange jacket 10. The fluid will flow downwardly from the fluid inlet 30 toward the fluid outlets 32 and 34. Eventually, the fluid will pass outwardly of the fluid outlets 32 and 34 adjacent to the bottom edges 40 and 42, respectively, of the heat exchange jacket 10.

In FIG. 1, it can be seen that the fluid outlets 32 and 34 are positioned adjacent to the bottom edges 40 and 42. The fluid outlets 32 and 34 face in the same direction as the fluid inlet 30. This facilitates installation of the heat exchange jacket 10. Additionally, the fluid outlets 32 and 34 have a longitudinal axis which is parallel to the longitudinal axis of the fluid inlet 30.

The heat exchange jacket of the present invention is formed of a polymeric material so as to facilitate the manufacture of the jacket 10 in an inexpensive manner. The material which is used for the heat exchange jacket 10 is a thermally conductive ABS material loaded with aluminum. As such, the polymeric material used for the jacket 10 is highly thermally conductive. Any heat imparted to the housing of the pump motor will be passed to the heat exchange chamber 16 through the thermal conductivity of the bottom surface 14.

FIG. 2 is an end view of the heat exchange jacket 10 of the present invention. As can be seen, the bottom surface 14 has a partially circular configuration extending for approximately 250 degrees. It can further be seen that the top surface 12 is in generally concentric relationship with the bottom surface 14 but of a greater diameter. The top surface 12 is spaced from the bottom surface 14 so as to define the heat exchange chamber 16 therebetween. The surface 50 on the forward end 36 of the jacket 10 will extend between the top surface 12 to the bottom surface 14. The fluid inlet 30 is positioned on the top of the top surface 12 generally centrally between the fluid outlets 32 and 34. This central location facilitates the even flow of fluids through the respective outlets 32 and 34. As such, fluid will divide evenly so that the same amount of fluid will pass over the inner surface of the bottom surface 14. The fluid outlets 32 and 34 are located outwardly of the bottom edges 40 and 42, respectively. As such, fluid will pass for a maximum distance before exiting the jacket 10 at the fluid outlets 32 and 34. Ribs 26 are shown as extending outwardly from the top surface 12 of the jacket 10.

FIG. 3 shows the heat exchange jacket 10 from a side view. In particular, FIG. 3 shows that the surface 50 at the forward end 36 tapers at an approximately 45 degree angle from the top surface 12 toward the bottom surface 14. Similarly, the surface 56 at the rearward end 38 tapers in approximately 45 degree angle from the top surface 12 to the bottom surface 14. It has been found that this tapering arrangement unexpectedly causes turbulence of the fluid on the interior of the chamber 16 so as to maximize the heat exchange effect.

In FIG. 3, it can be seen that the fluid inlet 30 includes connector 44 facing the forward end 36 of the jacket 10. Manifold area 46 has a back surface 48 which extends downwardly to the rearward end 38. It has been found that the tapering in this area facilitates the rapid introduction of fluid into the heat exchange chamber 16 and the even delivery of the fluid to both sides of the heat exchange jacket 10.

Figure 5:
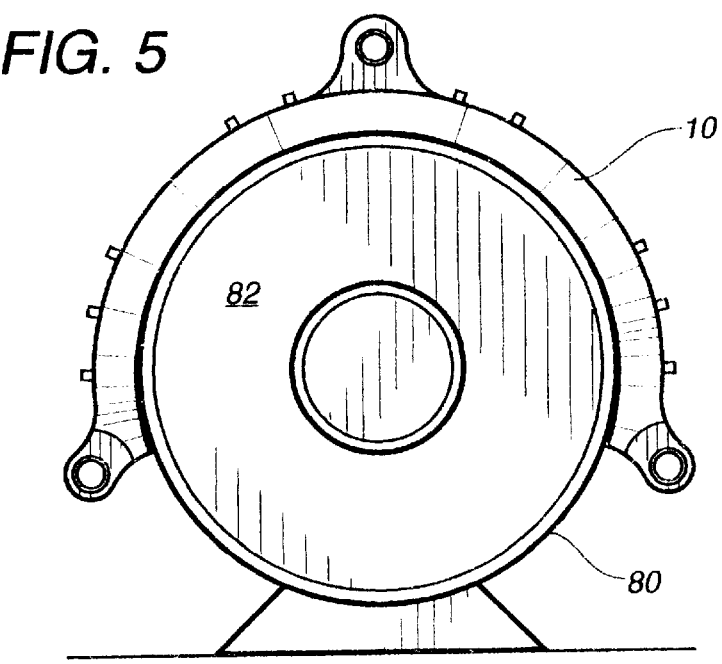
FIG. 5 shows an end view of the installation of the heat exchange jacket of the present invention upon the housing of the pump motor.

Referring to FIGS. 4 and 5, the attachment of the jacket 10 of the present invention is particularly illustrated. It can be seen that the bottom surface 14 of the jacket 10 extends for approximately 250 degrees. The bottom edges 40 and 42 are angled. The inside diameter of the bottom surface 14 is approximately the same diameter as the housing 80 of the pump motor 82. The material of the jacket 10 makes it sufficiently resilient such that when placed on the upper curved portion of the housing 80 of motor 82, and pressed downwardly, it will snap into place over the round housing 80. The sides of the jacket 10 flex outwardly as they pass the midsection of the motor 82. Since the jacket extends for approximately 250 degrees around housing 80, it will be sufficiently resilient and firmly held in place against the housing 80 of the motor 82. The jacket 10 can also be installed by sliding it axially onto the housing 80 from one end. The resiliency of the jacket 10 also allows it to be easily removed by pulling outwardly and upwardly on the side edges. Should it be desirable to further secure the jacket 10 to the housing 80 of the pump motor 82, a suitable adhesive can be applied prior to installation. FIG. 5 shows the jacket 10 as installed onto the housing 80 of the pump motor 82.

The jacket 10 of the present invention is connected to the pump motor 80 and to the spa in the manner described in U.S. Pat. No. 5,509,463.

The present invention has a number of advantages over the jacket of U.S. Pat. No. 5,509,463. In particular, the material which is used for the jacket 10 is enhanced thermal conductive ABS that is loaded with aluminum. As such, the heat exchange characteristics of the jacket 10 are significantly improved. By facing the ports 30, 32 and 34 toward a single end of the jacket 10, installation is accomplished in a simpler fashion. The location of those ports at the end of the jacket 10 also improves the heat exchange flow characteristics of the fluid on the interior chamber 16. The ribs 26 on the top surface 12 of the jacket 10 improve the rigidity and strength of the jacket 10.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

We claim:

1. A heat exchange jacket for attachment to an external surface of a pump motor comprising:

a bottom surface having a shape conforming to a curvature of the pump motor;

a top surface joined to said bottom surface so as to define a heat exchange chamber therebetween;

a fluid inlet connected to said top surface and communicating with said chamber;

a fluid outlet communicating with said chamber, said bottom surface and said top surface and said fluid inlet and said fluid outlet being formed of a polymeric material;

forward end extending between said top surface and said bottom surface; and a rearward end extending between said top surface and said bottom surface, said forward end tapering outwardly from said top surface toward said bottom surface, said rearward end tapering outwardly from said top surface to said bottom surface.

2. The jacket of claim 1, said fluid outlet position below said fluid inlet.

3. The jacket of claim 1, said bottom surface having a curved shape, said top surface extending in concentric relationship to said bottom surface.

4. The jacket of claim 3, said bottom surface having a partially circular configuration extending for greater than 180 degrees.

5. The jacket of claim 1, said forward end extending at an angle of approximately 45 degrees from said bottom surface, said rearward end extending at a 45 degree angle from said bottom surface.

6. The jacket of claim 1, said fluid inlet positioned above said top surface and facing said forward end, said fluid inlet located between said forward end and said rearward end.

7. The jacket of claim 6, said fluid inlet having a back surface tapering downwardly toward said bottom surface and into said chamber, said back surface extending toward said rearward end.

8. The jacket of claim 1, said top surface having a plurality of ribs extending between said forward end and said rearward end, each of said plurality of ribs being in parallel relationship to an adjacent rib.

9. The jacket of claim 1, further comprising:

a first bottom edge extending between said bottom surface and said top surface at one side thereof, and a second bottom edge extending between bottom surface and said top surface at another side thereof.

10. The jacket of claim 9, said fluid outlet comprising:

a first fluid outlet extending outwardly from said one side adjacent to said first bottom edge; and a second fluid outlet extending outwardly from said another side adjacent to said second bottom edge.

11. The jacket of claim 10, said first and second fluid outlets having a longitudinal axis in parallel relationship to a longitudinal axis of said fluid inlet, said first and second fluid outlets facing a same direction as said fluid inlet.

12. The jacket of claim 1, said polymeric material being a thermally conductive ABS material loaded with aluminum.

13. A heat exchange apparatus comprising:

a pump motor having a housing;

a jacket removably affixed to an external surface of said housing, said jacket being formed of a polymeric material, said jacket having a bottom surface with a shape matching at least a portion of said housing, said jacket having a top surface connected to said bottom surface so as to define a heat exchange chamber therebetween, said jacket having a fluid inlet communicating with said heat exchange chamber, said jacket having a first fluid outlet on one side of said jacket and a second fluid outlet on an opposite side of said jacket;

a forward end extending between said top surface and said bottom surface; and a rearward end extending between said top surface and said bottom surface, said forward end tapering outwardly from said top surface towards said bottom surface, said rearward end tapering outwardly from said top surface to said bottom surface.

14. The apparatus of claim 13, said jacket having a plurality of ribs formed on said top surface and extending between a forward end and a rearward end of said top surface, each of said plurality of ribs being in parallel relationship to an adjacent rib.

15. The apparatus of claim 13, said fluid inlet positioned above said top surface and facing said forward end, said fluid inlet located between said forward end and said rearward end.

16. The apparatus of claim 13, said polymeric material being a thermally conductive ABS material loaded with aluminum.

17. The apparatus of claim 13, said first and second fluid outlets having a longitudinal axis in parallel relationship to a longitudinal axis of said fluid inlet, said first and second fluid outlets facing a same direction as said fluid inlet.

* * * * *